April 14, 1959  A. D. SMITH  2,882,048
ARTICLE HANDLING DEVICE
Filed March 19, 1954  12 Sheets-Sheet 1

INVENTOR.
ARTHUR DEAN SMITH
BY James E. Toomey
ATTORNEY

April 14, 1959   A. D. SMITH   2,882,048
ARTICLE HANDLING DEVICE
Filed March 19, 1954   12 Sheets-Sheet 2

INVENTOR.
ARTHUR DEAN SMITH
BY James E. Toomey
ATTORNEY

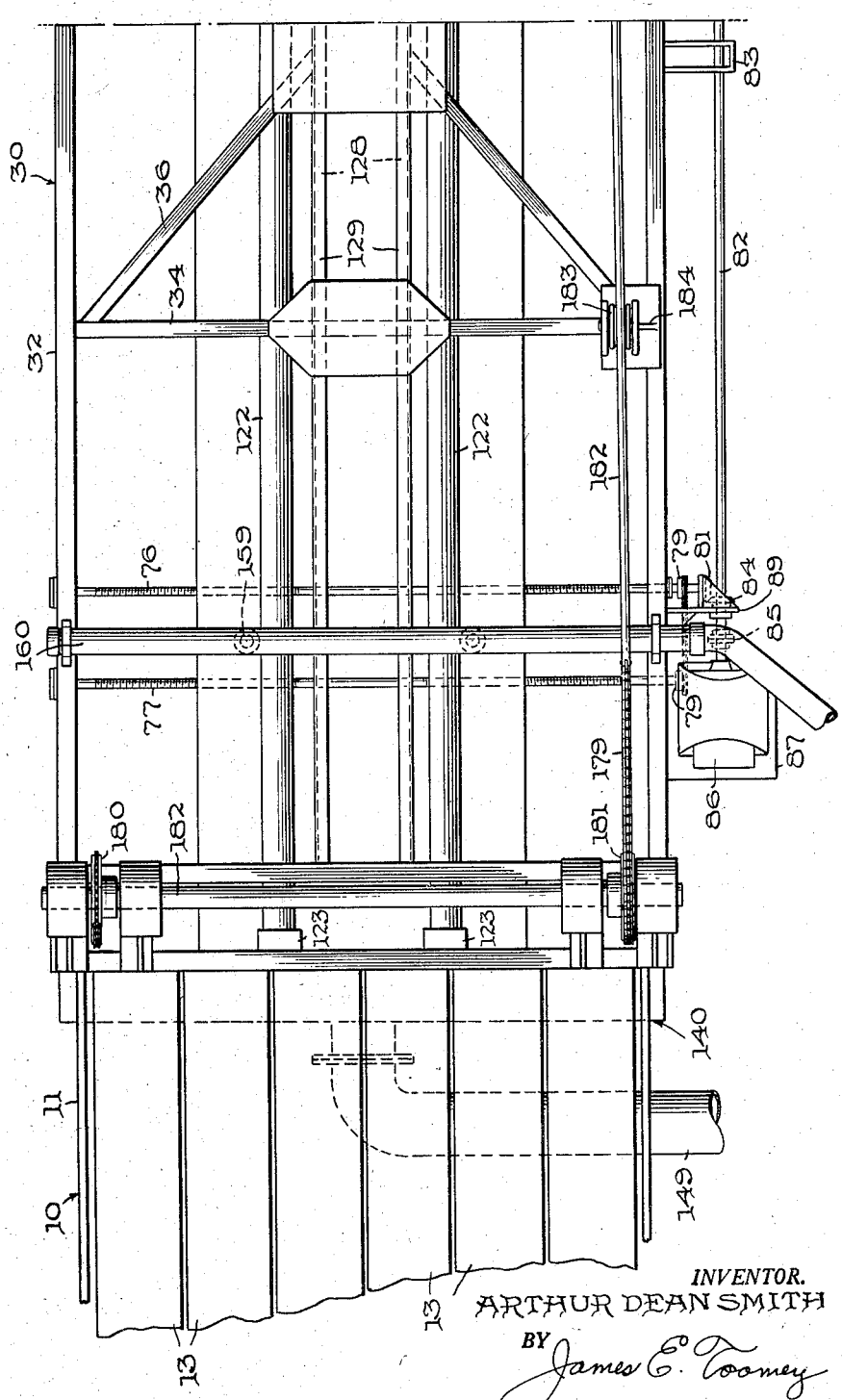

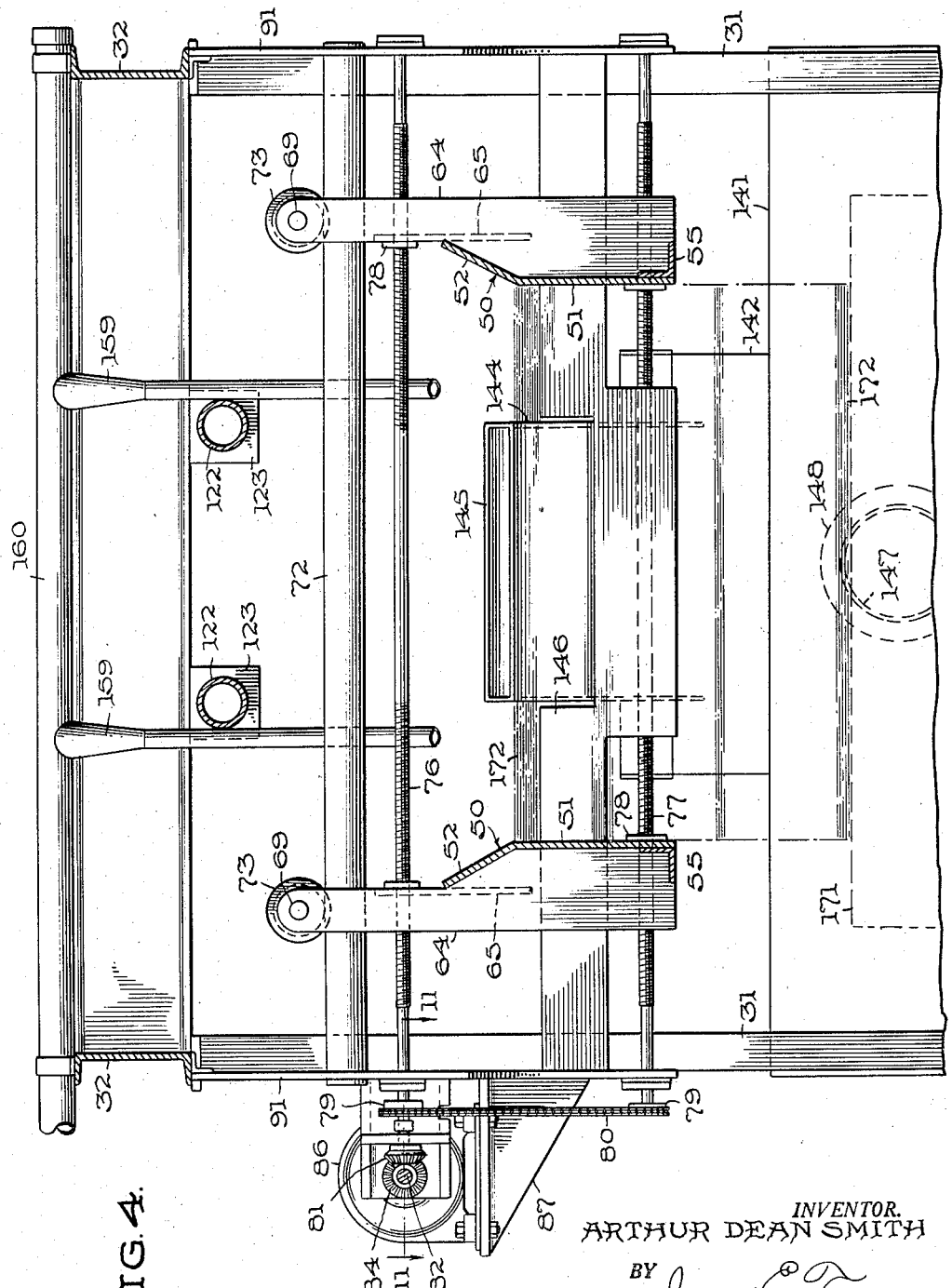

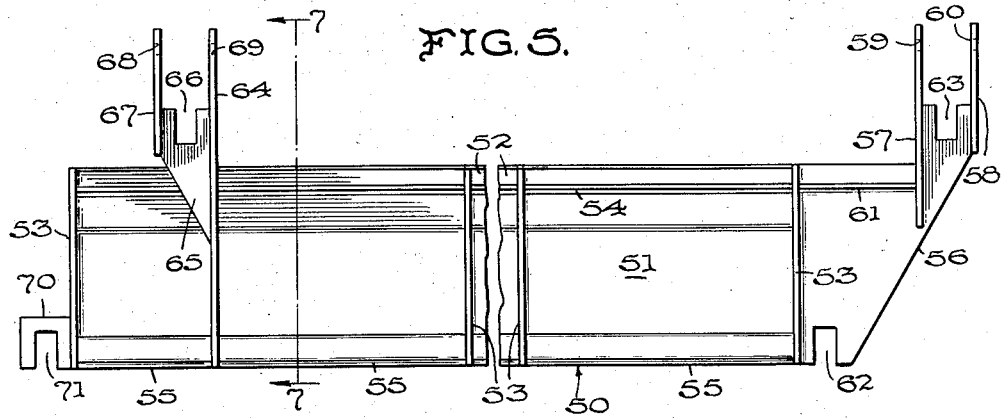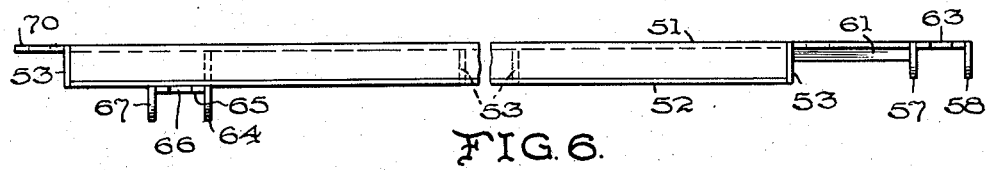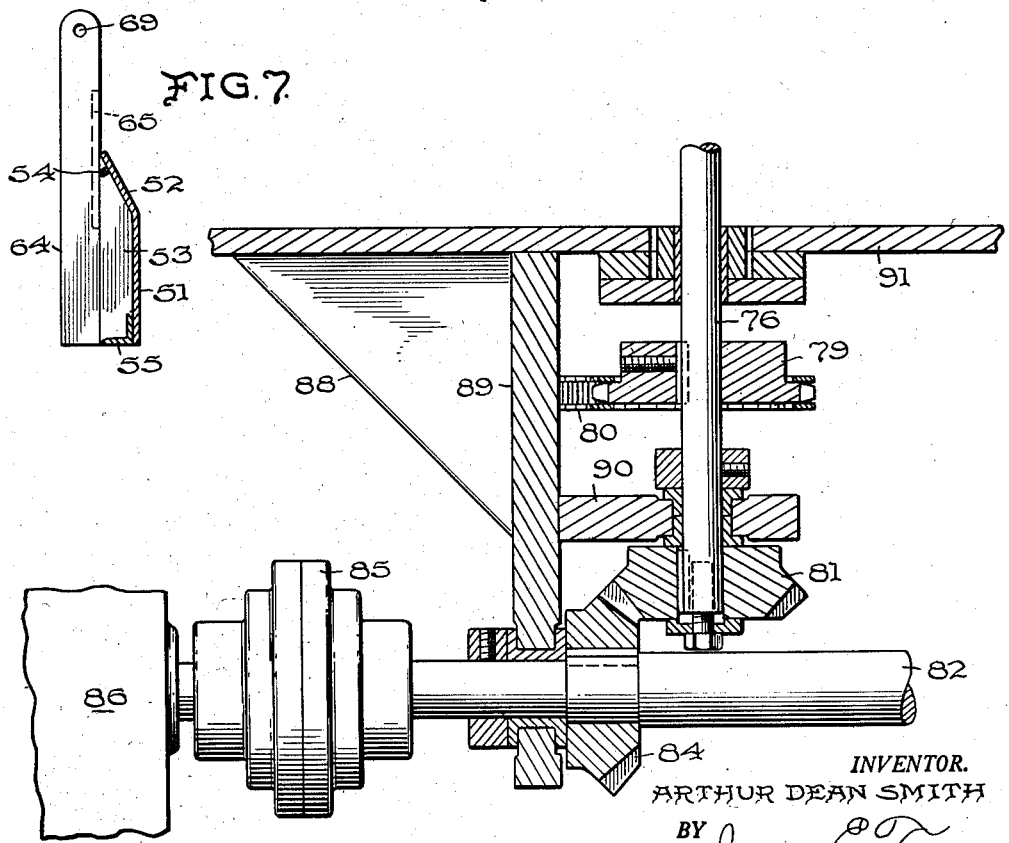

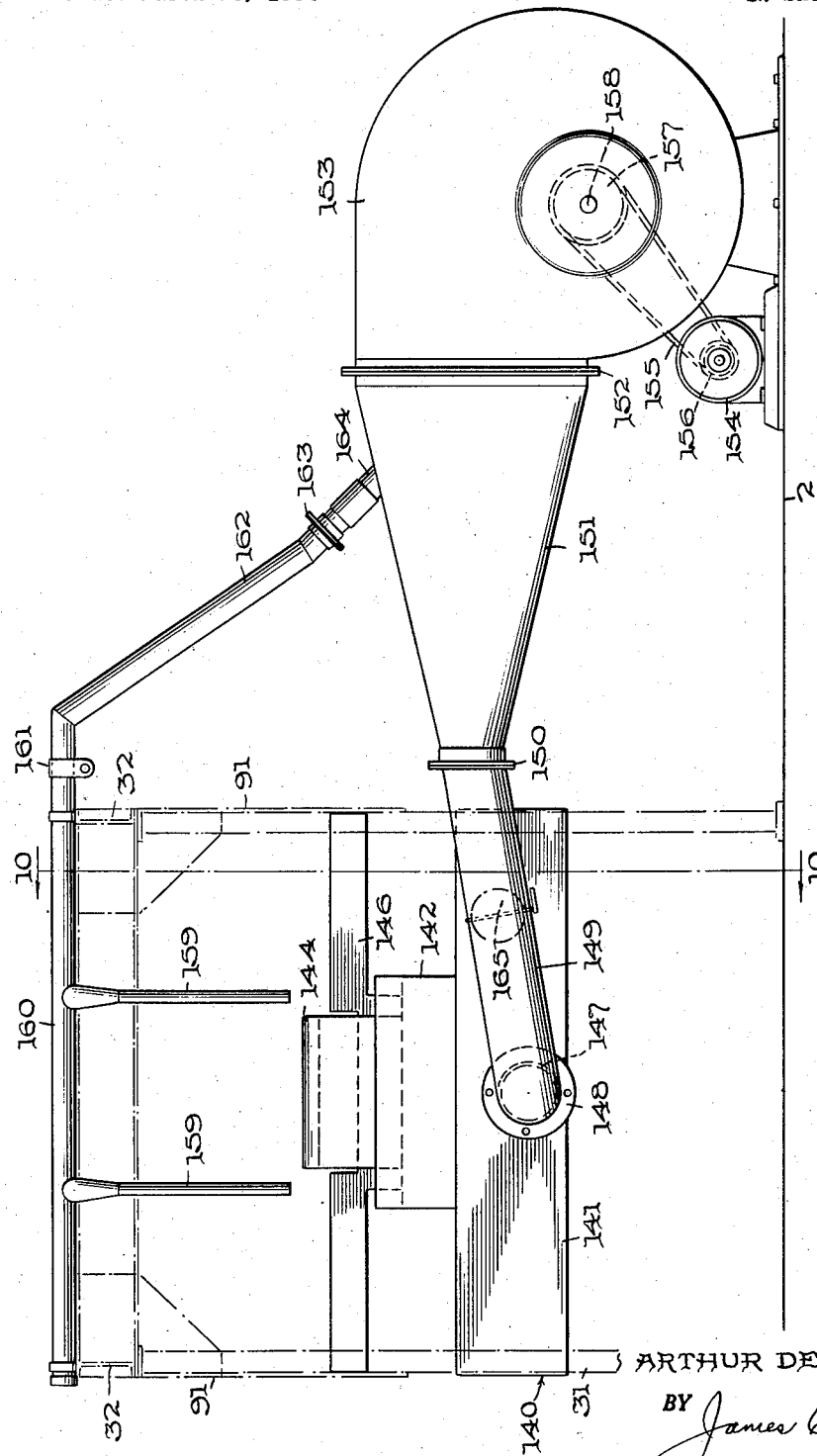

INVENTOR.
ARTHUR DEAN SMITH

April 14, 1959 A. D. SMITH 2,882,048
ARTICLE HANDLING DEVICE
Filed March 19, 1954 12 Sheets-Sheet 10

INVENTOR.
ARTHUR DEAN SMITH
BY James E. Toomey
ATTORNEY

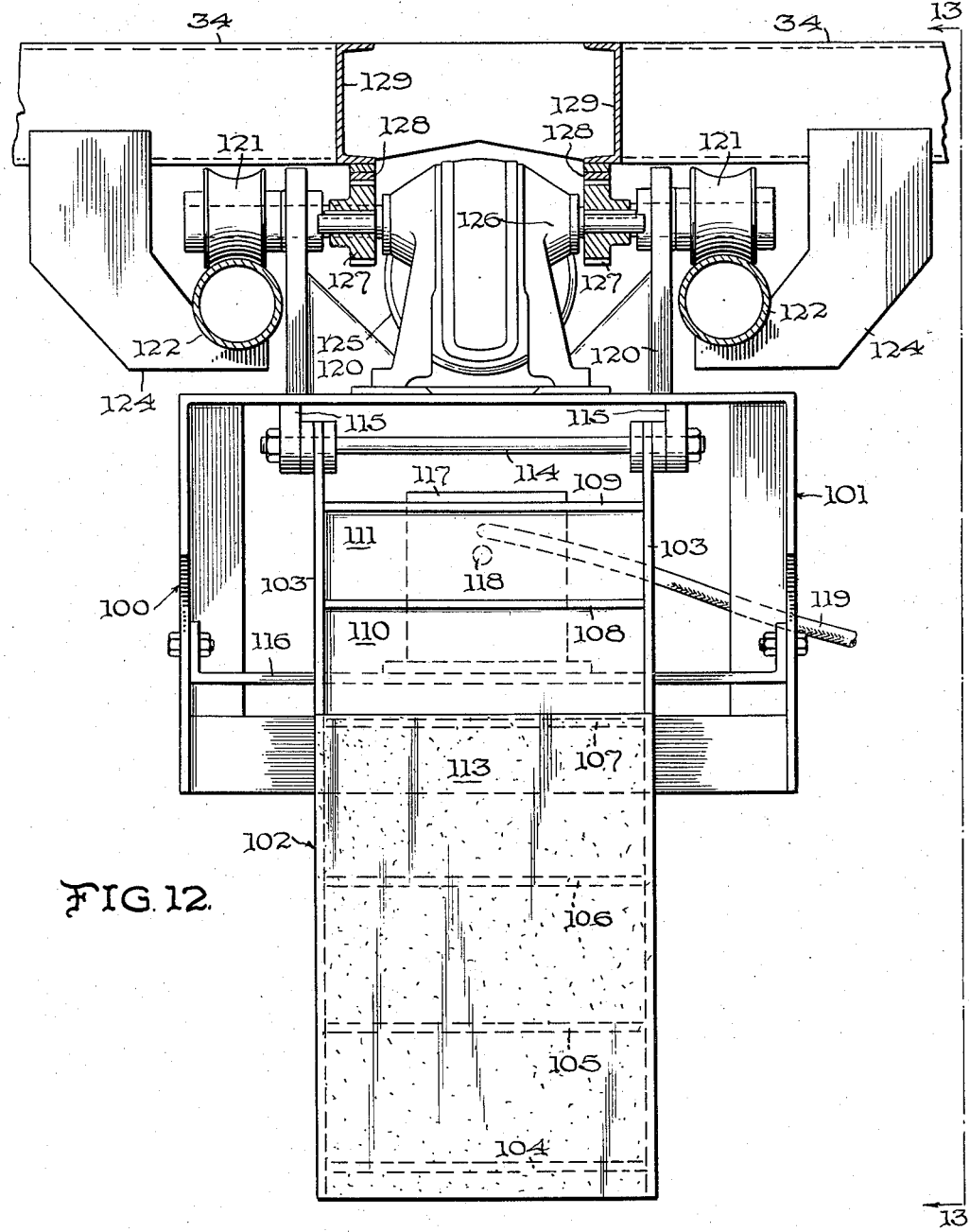

INVENTOR.
ARTHUR DEAN SMITH

United States Patent Office 2,882,048
Patented Apr. 14, 1959

2,882,048

ARTICLE HANDLING DEVICE

Arthur Dean Smith, San Lorenzo, Calif., assignor to Kaiser Aluminum & Chemical Corporation, Oakland, Calif., a corporation of Delaware Application March 19, 1954, Serial No. 417,436

7 Claims. (Cl. 271—68)

This invention relates to the handling of sheets, strips, plates, or the like material. More particularly, it is concerned with providing a novel apparatus and method of handling such material wherein the material is received and stacked or piled in an orderly fashion.

In the past various stacking apparatus have been proposed for use with machinery such as flying shears, etc. For example, where coiled metal strip is to be uncoiled and fed through a flying shear for the purpose of cutting the continuous strip into sections or sheets of predetermined length one practice is to provide a conveyor mechanism including a plurality of spaced, moving, endless belts upon which the sheared sheets are deposited. As each sheet comes from the shear it is deposited on the conveyor such that one longitudinal edge portion thereof extends over one side of the conveyor. Beneath the overhang of the sheet is provided a fluid pressure applying arrangement wherein a plurality of openings allow numerous streams of air to blow up under the overhanging longitudinal portion of the sheet. Two workmen are necessary for stacking the sheets, one being at either end of the longitudinal overhang of each sheet as it moves along the conveyor belts. Each workman grasps one end of the sheet and then pulls the sheet off the conveyor. The streams of air beneath the overhang of the sheet in effect support the weight of the sheet as it is pulled off of the conveyor and the workmen need only guide it down to a suitable stacking table. Such practice is quite limited in the speed of stacking due to the human element involved. Moreover, the sharp sheared sheet edges are a constant source of danger to the workmen stacking same.

It is an object of this invention to provide a novel apparatus and method for receiving and stacking sheet, strip, plate, or the like.

Another object of the invention is to provide a novel apparatus for receiving and stacking individual lengths of material which readily adapts itself to various types of machinery, such as flying shears, etc., whose production will be greatly enhanced.

Another object of the invention is to provide a novel method for receiving and stacking individual sections of material of different thicknesses or gauge, length and width and wherein said material is stacked in orderly fashion.

A further object of the invention is to provide a novel apparatus for receiving and stacking individual sections of material which is readily adjustable to handling various sizes and types of material.

These and other objects are accomplished by providing a novel material receiving and stacking apparatus which includes a suitable upstanding frame. Dependingly attached to the frame, and movable relative thereto, are provided a pair of longitudinally extending side plates in opposing relationship to each other and adapted to receive sheet, or the like, material therebetween. Suitable means are employed for moving the side plates toward and away from each other to properly position same for a given width of sheet to be received therebetween. Also dependingly attached to the frame, and movable relative thereto, is an end stop means. The end stop is provided between the side plates and is effective to stop the forward motion of each sheet as it is received in between the side plates from suitable delivery means. Suitable means are employed for moving the end stop longitudinally of the frame and side plates for purpose of adjustment to varying lengths of sheet to be handled. Located adjacent one end of the side plates, in opposing relationship to the end stop and below the delivery means, is provided a fluid pressure means which is attached to the frame. Further fluid pressure means may depend from the frame above the side plates and above the end of the delivery means. Below the side plates are provided suitable elevator and sheet material receiving table means and wherein the table means can be raised into operative position relative to the side plates, end stop, and fluid pressure means. With the elevator and table in operative position, each sheet received from the delivery means will pass in between the side plates and as each sheet passes therein the lower fluid pressure applying means provides a fluid cushion causing the sheet to float along until the forward end abuts the end stop. As the rearward end of each sheet is received between the side plates, the operation of the upper fluid pressure applying means ensures against undesirable upward movement of the sheet end and assists in forcing the rearward end of the sheet down below the effective portion of the lower fluid pressure means to permit each successive sheet to drop by gravity in flat relationship onto the stack of previously received and stacked sheets.

Other objects, novel features and advantages of the invention will become more apparent, when the following detailed description of one embodiment thereof is read in conjunction with the accompanying drawings, wherein:

Figures 1 and 1a constitute an interrupted side elevational view of the material handling apparatus of the instant invention in association with a conveyor delivery device;

Figures 2 and 2a constitute an interrupted top plan view of the apparatus shown in Figures 1 and 1a with parts removed for purpose of clarity;

Figure 3 is an end elevational view of the apparatus shown in Figures 1 and 1a taken along line 3—3 of Figure 1a;

Figure 4 is a sectional, elevational view of the apparatus taken along the line 4—4 of Figure 1 and wherein parts have been removed for purpose of clarity;

Figure 5 is an enlarged, fragmentary, side elevational view of one of the adjustable side plates shown in Figures 1–4;

Figure 6 is a fragmentary, top plan view of the side plate shown in Figure 5;

Figure 7 is a sectional, elevational view of the side plate shown in Figures 5 and 6, taken along line 7—7 of Figure 5;

Figure 8 is an end elevational view, with parts removed for purpose of clarity, showing the general arrangement of the fluid pressure means of the invention;

Figure 11 is an enlarged sectional view, taken along the line 11—11 of Figure 4, of the motor, gear and shaft arrangement utilized for adjustment of the side plates;

Figure 12 is an enlarged, fragmentary, elevational view, with parts removed for purpose of clarity, of the end stop construction of the invention and means for adjusting the position of same taken along line 12—12 of Figure 1a.

Figure 1:
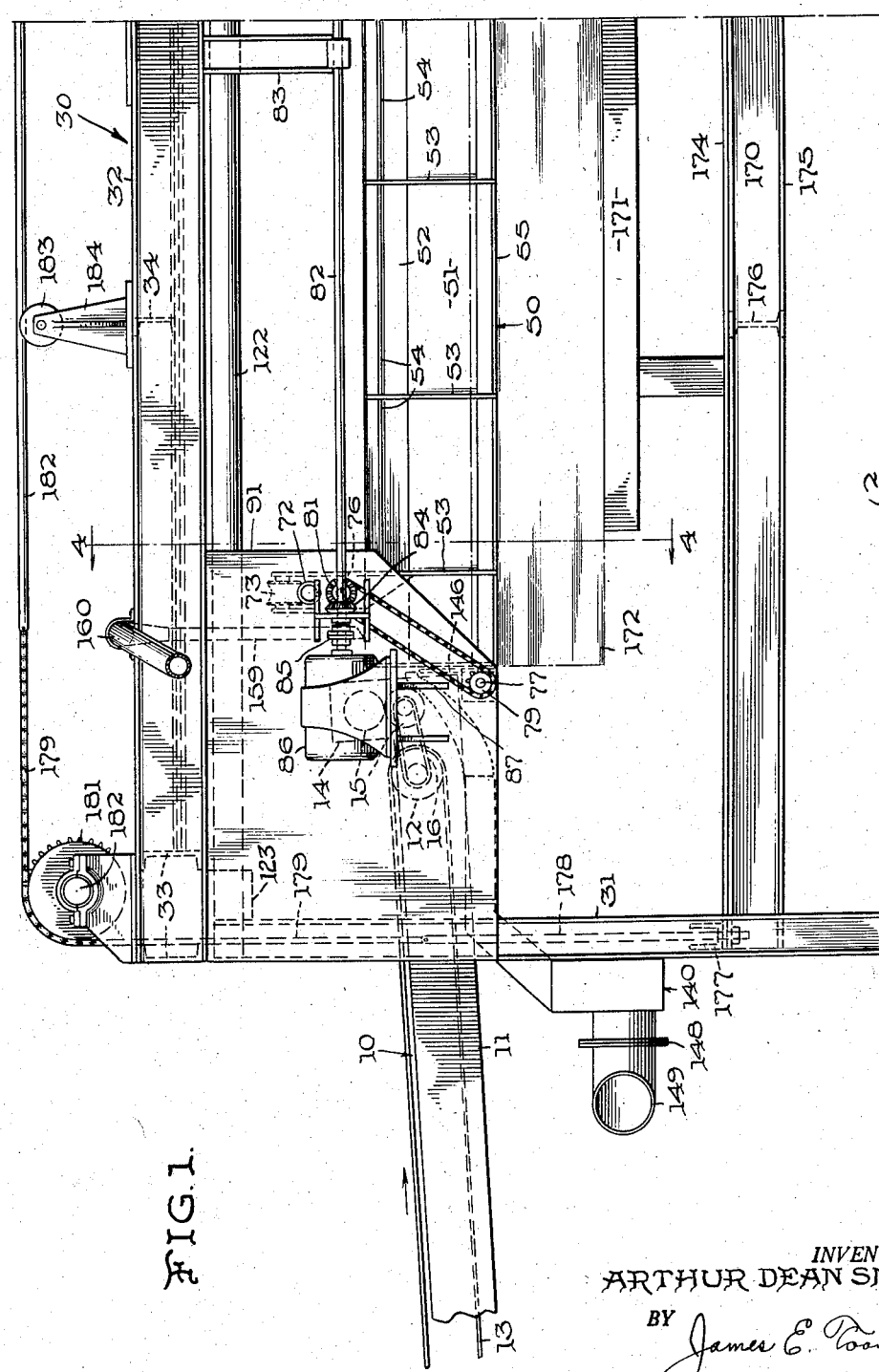

With further reference to the drawings, in which like reference numerals designate corresponding parts and elements, the apparatus of this invention has been illustrated as incorporating a material delivery means, an upstanding frame means, side plate guide means, end stop means, fluid pressure applying means, and a stack receiving means, each of which is represented by the reference numerals 10, 30, 50, 100, 140 and 170, respectively.

Figure 1A:
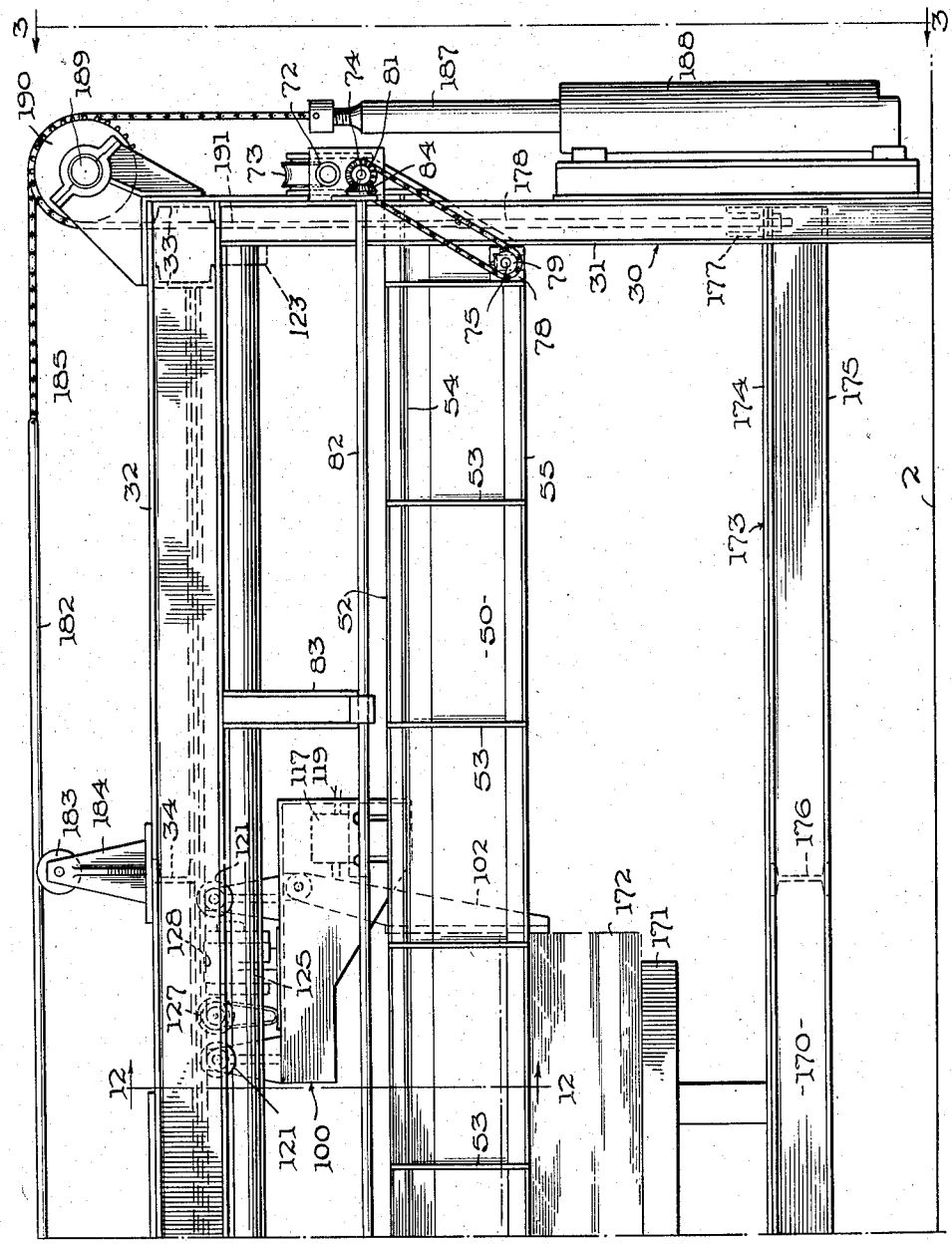

As shown in Figures 1 and 1a, a suitable delivery means 10 is provided for delivery of sheet material, or the like, to the receiving and stacking apparatus. Any of various conventional conveyor mechanisms may be used. As illustrated, in fragmentary manner, the conveyor may generally comprise suitable side frame members 11 between which are rotatably mounted a plurality of belt pulleys or drums 12 which support a plurality of endless belts 13. Suitable belt tightening pulleys (not shown) may be provided to maintain proper tension in the belts. At the right hand end of frame members 11 there are provided upstanding frame members 14 which rotatably support a pair of driven pinch rolls 15. As one means for providing movement of pinch rolls 15, use can be made of suitable belt or chain means 16 between pulley or drum 12 and the lower pinch roll 15. The top surfaces of endless belts 13 serve as a conveyor to transport the sheet material brought into contact therewith, the translatory motion imparted to the sheet being one of delivery in the direction of the arrow. Continued movement of the sheet in the direction of the arrow brings the forward end thereof into contact with pinch rolls 15 which thereafter complete the delivery of the sheet into the receiving and stacking apparatus. It is to be understood that the specific details of the conveyor apparatus for delivery of the sheet to the receiving and stacking apparatus form no part of the instant invention, it being sufficient to state that various suitable conveyor mechanisms can be used.

As can be seen in Figures 1 and 1a, the right hand end of delivery means 10 extends into upstanding frame 30, which includes the upright members 31 mounted on floor 2, longitudinally extending side members 32, and cross-members 33, preferably in the form of structural channels. To give added rigidity, provision is also made of cross-braces 34, 35 and 36.

Dependingly attached to frame 30, and movable relative thereto are a pair of side plates 50 which are in opposing position as shown more clearly in Figure 4. Inasmuch as each side plate is of similar construction, a discussion of the details of one will suffice for both. In this regard, reference is made to Figures 5 to 7 which illustrate in detail the structure of the side plate. As can be seen, side plate 50 generally comprises a longitudinally extending member 51 which is provided with an upwardly and outwardly extending flange 52 along the major portion of the length thereof. The flange is desirable for correcting any misalignment of the sheets as they are fed from the delivery or conveyor means 10 in between the opposed side plates. For purposes of giving rigidity to the side plate a plurality of vertical ribs or braces 53 and longitudinal ribs or braces 54 and 55 are suitably affixed thereto. Although not shown, the side plate may also be provided with one or more longitudinally extending tie rods connected to suitable brackets affixed to and projecting outwardly of ribs or braces 53 for purposes of ensuring against longitudinal bending or bulging of the side plate outwardly. The necessity of such additional reinforcement will depend generally on the length of the side plate used and the gauge of metal used in fabricating same.

At each end of the side plate member are provided support means for depending attachment to frame 30. The support means at the right-hand end of the member comprises a plate member 56 to which is suitably affixed vertically extending arms 57 and 58. Arms 57 and 58 are spaced apart and are provided with aligned openings 59 and 60, respectively, for purposes of mounting a roller therebetween to be described hereinafter. Plate 56 is suitably reinforced by provision of longitudinally extending rib or brace 61 and the downwardly projecting portion of arm 57, both being suitably affixed to plate 56. Additionally, each plate member 56 is provided with a generally rectangular recess 62 in the lower portion thereof and a similar recess 63 in the upper portion thereof, the purpose of which will be described hereinafter in conjunction with the means for moving the opposed side plates 50 toward or away from each other. The support means at the left-hand end of the side plate comprises a vertically extending arm 64, the lower inner portion of which forms a further vertical rib or brace 53 suitably affixed to member 51. Affixed to arm 64 is a member 65 which is provided with a generally rectangular recess 66 in the upper portion thereof. To the opposite side of member 65 is suitably affixed a vertically extending arm 67. Vertically extending arms 67 and 64 are provided with aligned openings 68 and 69, respectively, for purposes of mounting a roller therebetween to be described hereinafter. To the end rib or brace 53 is suitably affixed a member 70 which is provided with a generally rectangular recess 71 in the lower portion thereof. The function of recesses 66 and 71 will be described hereinafter in conjunction with the means for moving the opposed side plates 50 toward or away from each other.

As shown in Figures 1 and 1a, 3, and 4, the means for supporting the side plates from frame 30 comprises a tubular member 72 suitably affixed at either end to, and extending across, the frame 30 above each of the corresponding ends of the side plates 50. The spaced pairs of vertically extending arms 57, 58 and 64, 67 at the ends of each side plate are positioned such that the spaced arms straddle tubular members 72 with aligned openings 59, 60 and 68, 69 being above members 72. Grooved rollers 73 are suitably mounted between the vertically extending arms 57, 58 and 64, 67, the shafts for rollers 73 passing through the aligned openings 59, 60 and 68, 69. It will be seen that by such support means side plates 50 are dependingly supported at each end from frame 30 and are adapted for movement cross-wise of the frame.

As mentioned hereinbefore, means are provided for adjustment of the position of side plates 50 toward or away from each other for proper reception of sheets of various width. It will be understood that in speaking of "width" is meant the dimension thereof at right angles to the direction of travel of the sheet on the conveyor or delivery means 10. The side plate adjustment means is shown in Figures 1 to 4. As can be seen, a pair of shafts 74 and 75 having left and right-hand threaded screw portions are rotatably mounted across frame 30 at the right-hand end of side plates 50 and, likewise, a further pair of such screw threaded shafts 76, 77 are rotatably mounted across frame 30 at the left-hand end of the side plates. Threadedly mounted on the end of each of screw threaded shafts 74, 75, 76 and 77 is a nut member 78. Each nut member is provided with a centrally located groove around the periphery thereof, the width of the groove being slightly greater than the thickness of plate 56 and opposite end member 70 of side plates 50. Also, the periphery of the base of the groove is of generally rectangular configuration such that it complements the rectangular recesses 62, 63, 66 and 71 of the side plates which receive bolt members 78 therein. By such means, the nut members cannot rotate relative to the side plates and any rotary movement imparted to the screw threaded shafts will be translated by the nut members to movement longitudinally along the screw threaded shafts 74, 75, 76 and 77 will in turn be transmitted to side plates 50. Thus, because the shafts 74, 75, 76 and 77 are provided with oppositely threaded portions, the parallel guide plates will be drawn toward or away from one another depending on the direction in which the shafts 74, 75, 76 and 77 are rotated.

Near one end of each of screw threaded shafts 74, 75, 76 and 77 is provided a sprocket wheel 79 and the sprocket wheels on each pair of screw threaded shafts 74, 75 and 76, 77 are interconnected by chains 80. Accordingly, any rotation of one of the shafts of each pair of screw threaded shafts 74, 75, 76 and 77 will be imparted to the other screw such that side plates 50 will remain in the same vertical and longitudinal position relative to each other during any lateral movement thereof caused by rotation of the shafts. On the end of shafts 74 and 76, outwardly beyond sprocket wheels 79, is provided a miter gear 81. Extending longitudinally of the frame 30 is a shaft or rod 82 which is rotatably supported by suitable brackets 83 affixed to frame 30. One each end of shaft 82 is mounted a miter gear 84 which is in meshing engagement with one of the miter gears 81. As shown in Figure 1, the extreme left-hand end of shaft 82 is connected, by means of a suitable flexible coupling 85, to a suitable electric motor 86 of the reversible type. Motor 86 is mounted on suitable bracket means 87 affixed to the side of frame 30. For a more clear illustration of the motor and miter gear arrangement, reference is made to Figure 11. As shown in Figure 11, suitable support members 88, 89, and 90 support the outwardly extending end of screw threaded shaft 76, sprocket wheel 79, miter gears 81 and 84, and the left-hand end of shaft 82. Support members 88 and 89 are suitably affixed to a plate 91 which is affixed to the side of frame 30. It will be seen from Figure 4 that another plate 91 is affixed to frame 30 on the opposite side thereof to facilitate the mounting of screw threaded shafts 76, 77. It will be seen that when the motor 86 is driven in a predetermined direction, the various screw threaded shafts 74, 75, 76 and 77 will also be operated depending, of course, upon the direction of rotation of the motor, in one direction or another, thereby adjusting the side plates 50 to the width of sheet material to be received therebetween by bringing the side plates toward or away from one another.

Also dependingly attached to frame 30, and movable relative thereto is an adjustable end stop means 100. With particular reference to Figures 1, 1a, 2, 2a, 12 and 13, it will be seen that the end stop means generally comprises a carriage 101 from which pivotally depends an end stop 102. The end stop 102 comprises two spaced side members 103 which are joined together by a plurality of horizontal cross-members 104, 105, 106, 107, 108 and 109 and vertical cross-members 110 and 111. Extending across the front lower portion of side members 103 is a plate 112 to which is suitably affixed a resilient pad 113 of a material such as rubber. The end stop is pivotally connected to carriage 101 by means of shaft 114 which passes through suitable openings in the upper ends of side members 103 and which is suitably mounted at either end to support arms 115 projecting downwardly from the underside of the top of carriage 101. Suitably mounted on a bracket 116, secured to carriage 101, is an air cylinder 117 having a piston rod 118 projecting therefrom closely to vertical cross member 111. A conduit means 119 is provided for connection to a suitable source of compressed air (not shown) and wherein suitable valve means (not shown) are provided for regulating the air pressure to air cylinder 117, as desired.

When a sheet is received in between side plates 50 it will travel longitudinally of the side plates until the forward motion thereof is stopped by abutment with end stop means 101. The primary function of resilient pad 113 and air cylinder 116 is to stop the forward motion of the sheet and absorb the force thereof without damage to the forward portion of the sheet and to also enable stacking the sheets with the end portions thereof lying generally along the same vertical line. As the forward end of each sheet hits or abuts against the end stop 102, the end stop will absorb the impact by pivoting back against the piston rod 118. The air cylinder 117 is set for each given weight of sheet to allow a predetermined backward movement of piston rod 118. The forward motion of the sheet is virtually stopped upon initial abutment against the end stop and due to the inherent resiliency of pad 113 and the pressure exerted by piston rod 118 any further forward movement of the sheet is compensated for by the action of these forces moving the sheet in the reverse direction. Generally the end stop is operated such that the ends of the stacked sheets lie on a line closely adjacent to the face of pad 113 when the end stop has returned to its forward position awaiting entry of the next succeeding sheet.

Affixed to the top of carriage 101 are spaced pairs of support brackets 120 which have suitably mounted thereon rollers 121. Rollers 121 ride on tubular members 122 which are supported at each end in brackets 123 which are in turn affixed to the underside of cross-members 33. To give added support to tubular members 122, use can be made of suitable J-shaped brackets or hooks 124, one end of which is affixed to cross-braces 34 and the other end of which forms a cradle support for members 122.

For purposes of moving the carriage 101 longitudinally of the side plates 50 there is provided on top of the carriage a suitable electric motor 125 of the reversible type. In driving relationship with motor 125 is a suitable gear box 126, on the opposite ends thereof which are suitably mounted gears 127. Gears 127 are in meshing engagement with racks 128 which are mounted to the underside of channels 129 which are affixed to frame 30 as by connection to cross-members or braces 34, 35 and 36. It will be seen that when the motor 125 is driven in a predetermined direction, the end stop carriage 101 and end stop 102 will be moved longitudinally of side plates 50 depending, of course, upon the direction of rotation of the motor in one direction or another, thereby adjusting the end stop to the length of sheet material to be received between the side plates 50.

A fluid pressure applying means 140 is dependingly attached to frame 30 at the left end thereof and beneath delivery means 10, as shown in Figure 1. For a more clear showing of the fluid pressure applying means, reference is made to Figures 4, 8, 9 and 10. The fluid pressure means generally comprises a plenum chamber 141 which is suitably affixed to upright frame members 31. Projecting upwardly and inwardly from the central portion of chamber 141, and in fluid flow relationship therewith, are successively connected duct members 142, 143 and 144. Duct member 144 terminates in rectangular shaped mouth or opening 145. The opening 145 is positioned just below the line of delivery of the sheet material from delivery means 10. It is desirable to provide a suitable bumper 146 below the inner end of duct member 144 to prevent any tendency for contact of the rear end of the sheet, which has been received between side plates 50 and abutted against end stop 102, with duct members 142, 143 and 144 and causing damage thereto due to misadjustment of end stop means 100. Bumper 146 may be affixed at either end to side plates 91 of frame 30. The plenum chamber 141 is connected, by means of duct members 147, 149, and 151 and couplings 148, 150, and 152 to a fluid pressure source (fan) 153 mounted on floor 2. Fan 153 is driven by means of a suitable electric motor 154 through the medium of a plurality of endless belts 155 connecting multigroove pulley 156 of motor 154 to multi-groove pulley 157 affixed to the fan shaft 158.

Additional fluid pressure applying members 159 may be provided projecting downwardly from the top of frame 30 and terminating just above the line of delivery of the sheet material from delivery means 10. Members 159 are in fluid flow relationship with, and depend from, tubular cross-member 160 which is affixed to side members 32 of frame 30. Tubular member 160 is suitably connected to duct member 151 by means of couplings 161 and 163 and duct members 162 and 164. Suitable damper means 165 are mounted in duct member 149 and suitable damper means (not shown) are mounted in duct member 162 for maintaining accurate control of the fluid pressure issuing from each of the fluid pressure applying means.

Figure 3:
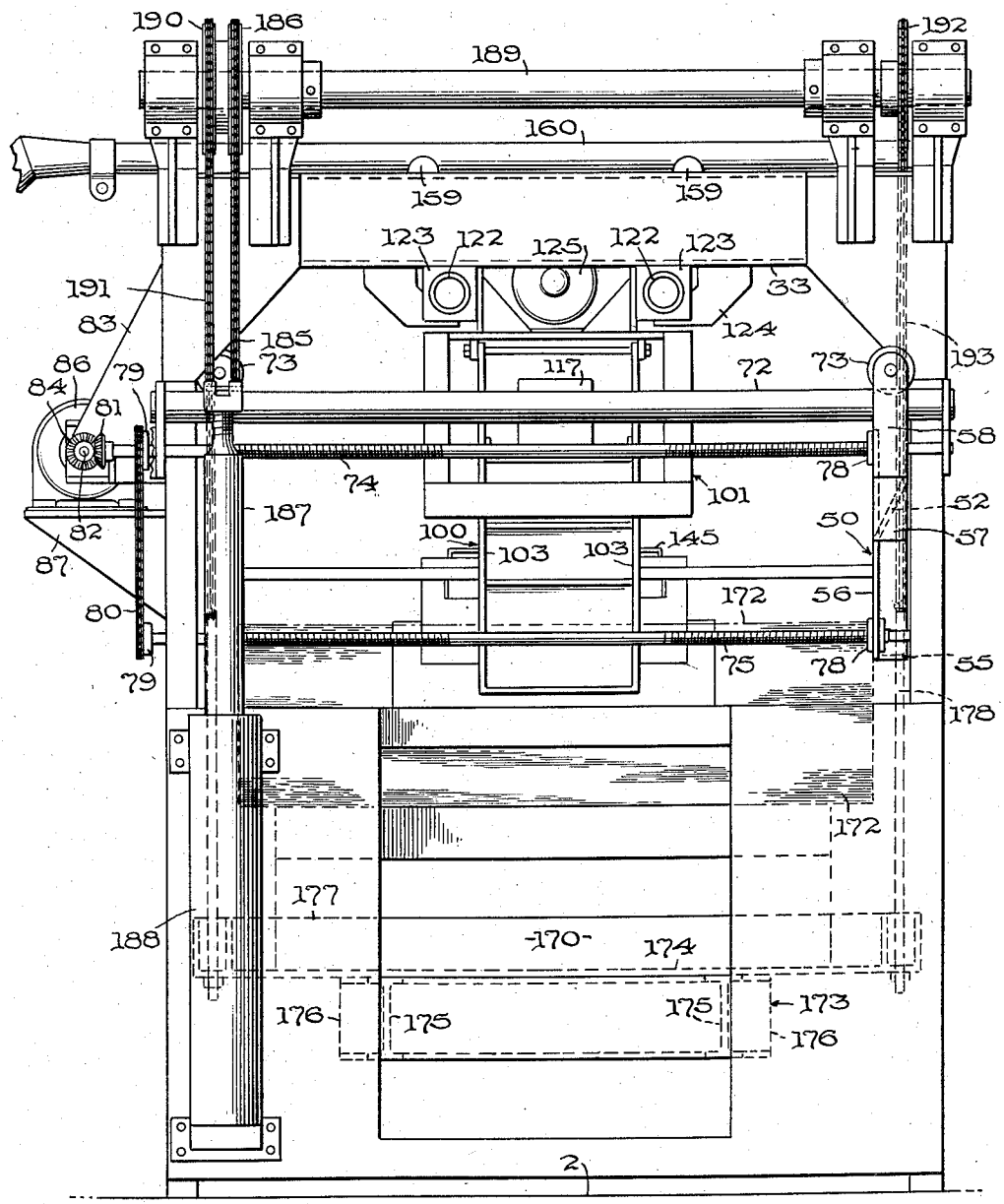
Figure 9:
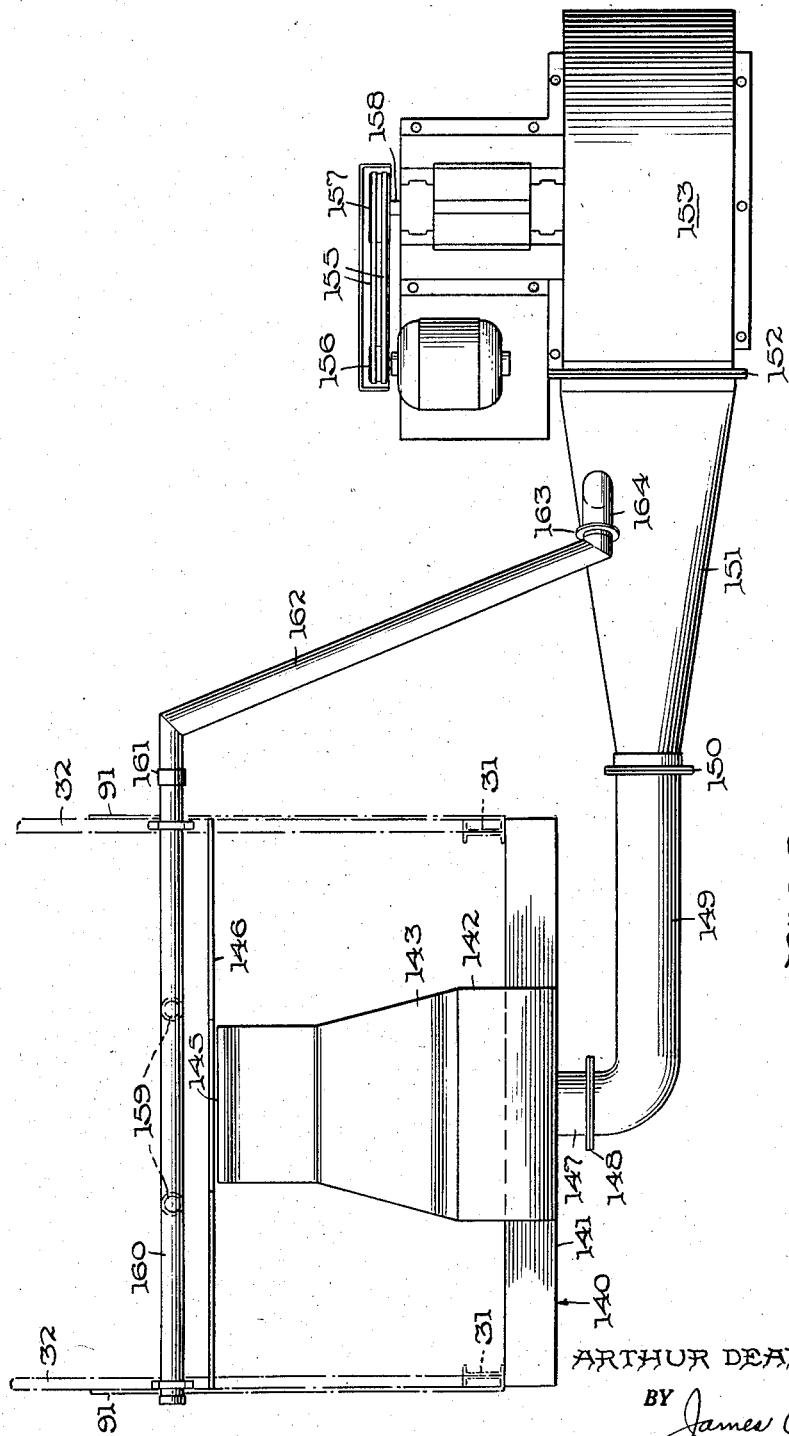
Figure 9 is a fragmentary top plan view of the fluid pressure means shown in Figure 8.
Figure 10:
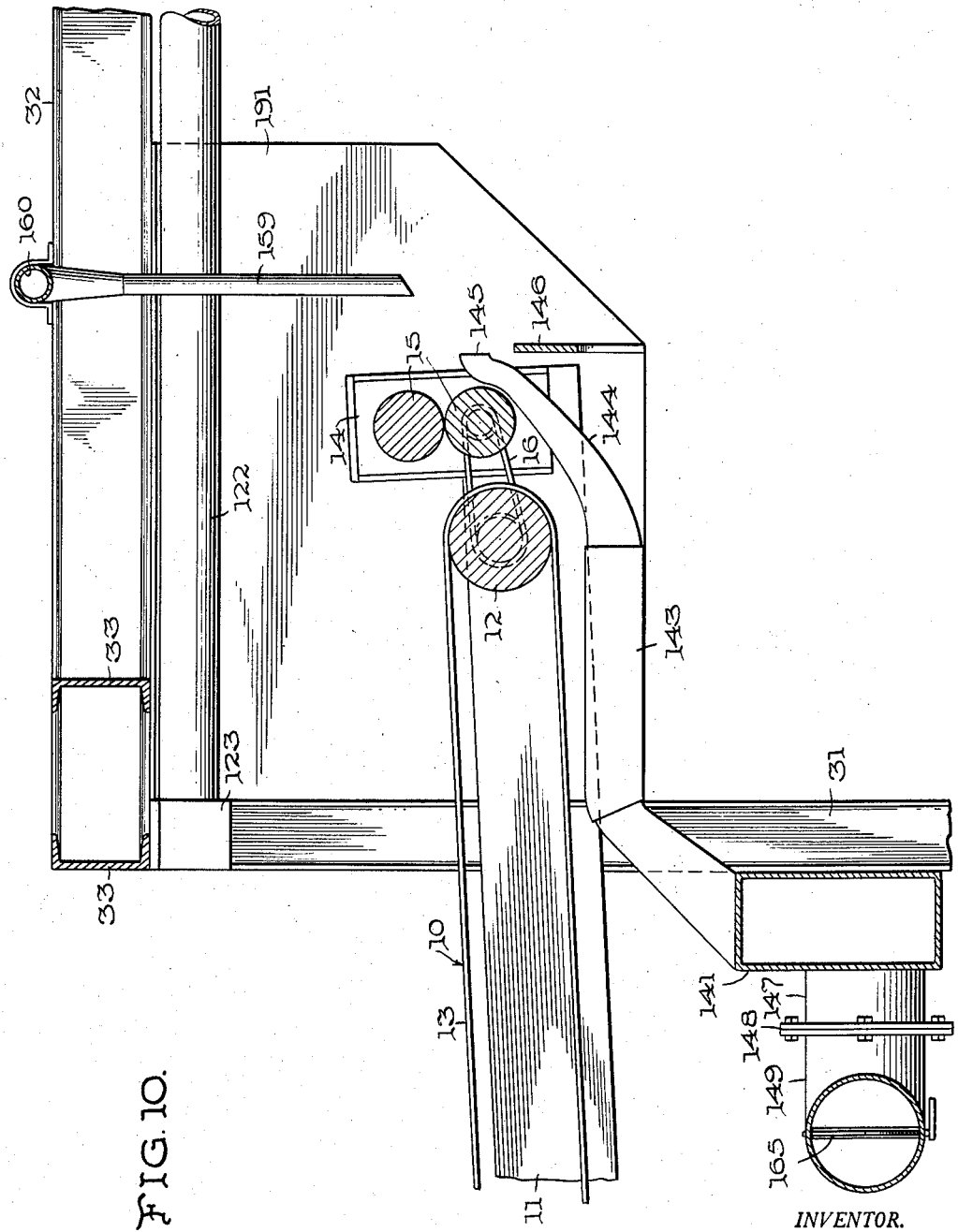
Figure 10 is a fragmentary, sectional, elevational view of the apparatus shown in Figures 8 and 9 taken along the line 10—10 of Figure 8.
Figure 13:
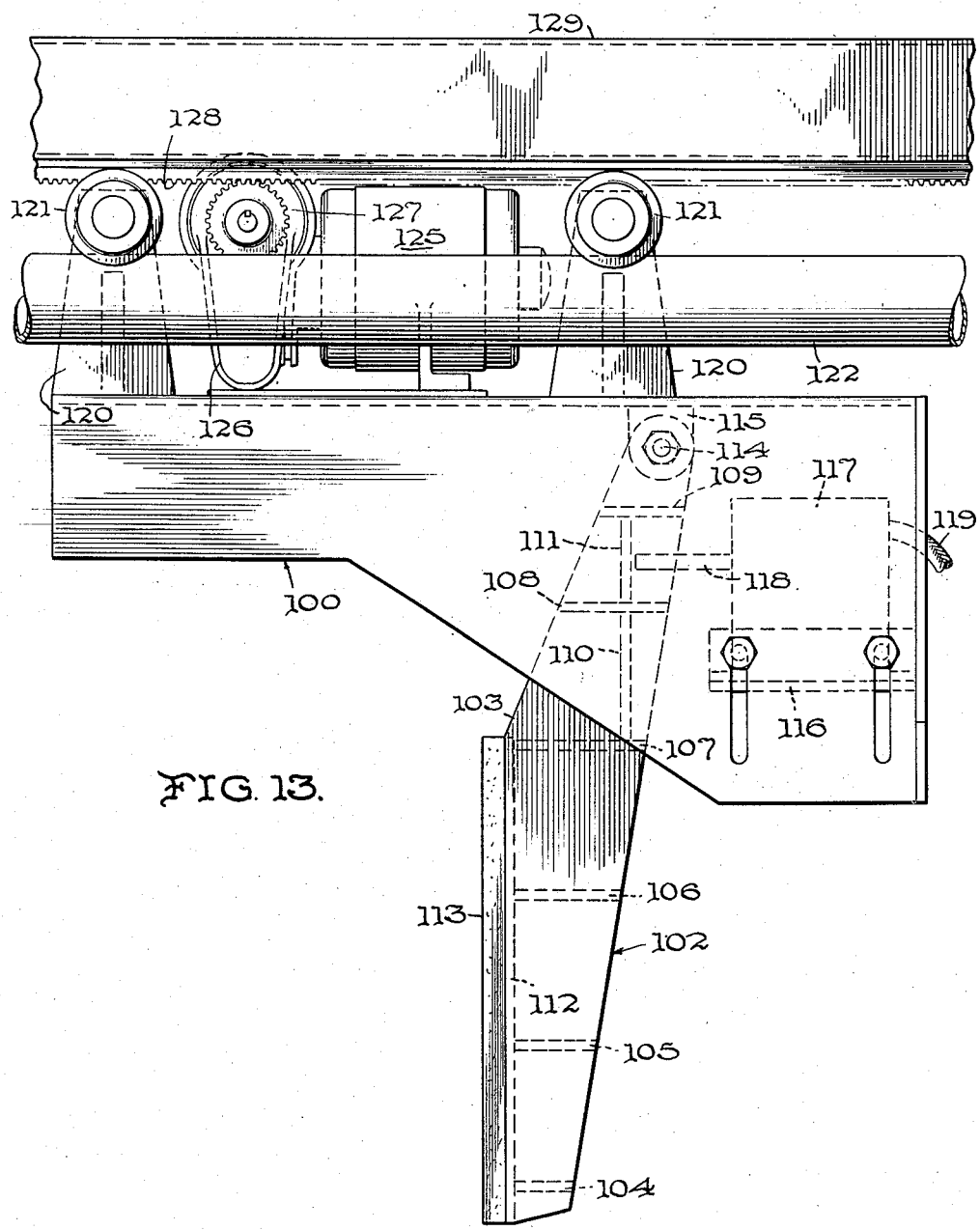
Figure 13 is an enlarged, fragmentary, side elevational view of the end stop construction taken along line 13—13 of Figure 12.

A sheet material stack receiving means 170 is located beneath side plates 50 and generally comprises a suitable platform or skid 171 for supporting a stack of sheets 172 and which is removably supported by elevator table 173. As shown in Figures 1, 1a and 3, elevator table 173 comprises a top plate 174 affixed to a framework consisting of longitudinal members 175 and cross-members 176, preferably structural channels. At the ends of table 173 and extending across thereof is affixed a channel member 177. The extreme ends of member 177 are positioned such that they are adapted to move vertically upward and downward between the inwardly projecting flanges of upright members 31 of frame 30.

To facilitate vertical movement of elevator table 173, and with particular reference to the left-hand side of Figures 1, 1a, 2 and 2a, a rod 178 is provided at each end of table cross-member 177 with the lower end of the rod affixed to the cross-member. A suitable chain 179 is connected to the upper end of each rod 178. The chain 179 on one end of cross-member 177 extends upwardly and is affixed to sprocket wheel 180 and is adapted to be wound up thereon. On the opposite end of cross-member 177 the second chain 179 extends upwardly and over a sprocket wheel 181. The sprocket wheels 180 and 181 are suitably affixed to shaft 182 mounted on top of frame 30 such that movement impartred to one sprocket wheel operates the other sprocket wheel. The chain 179 passing over sprocket wheel 181 is connected to one end of longitudinally movable rod 182 which rides on rollers 183. These rollers are suitably mounted on brackets 184 affixed to side member 32 of frame 30.

To the other end of rod 182 is connected a chain 185 which extends over and in engagement with sprocket wheel 186 and then downwardly and is affixed to the end of the piston rod 187 of a suitable hydraulic cylinder 188 which is mounted on the end of frame 30. Sprocket wheel 186 is affixed to rotatable shaft 189 which is mounted on the top of frame 30. Spaced closely to sprocket wheel 186 is a second sprocket wheel 190 which also is affixed to shaft 189. A suitable chain 191 is connected at the lower end to another rod 178 which in turn is affixed to one end of cross-member 177 on the right-hand end of elevator table 173. The chain 191 extends upwardly and over sprocket wheel 190, in engagement therewith, and then downwardly and is affixed to the end of piston rod 187. At the other end of shaft 189 is affixed another sprocket wheel 192. A chain 193 is connected at the lower end to a rod 178, which in turn is affixed to the opposite end of cross-member 177. The upper end of chain 193 is affixed to sprocket wheel 192 and is adapted to be wound up thereon. As in the case of sprocket wheels 180 and 181, sprocket wheels 186, 190 and 192 are affixed to common shaft 189 and movement imparted to one will be imparted to all the sprocket wheels. It will be seen that when the hydraulic cylinder 188 is actuated, imparting movement to piston rod 187, the material stack receiving means 170 will be moved vertically depending, of course, upon the direction of movement of piston rod 187 either upwardly or downwardly, thereby adjusting the height of skid 171 with respect to side plates 50, end stop 102, and fluid pressure applying means 140.

It is to be understood with respect to material stack receiving means 170 that skid or platform 171 may be any suitable type capable of being removed or replaced as desired by means of well known industrial type tractor devices. It will also be understood that in lieu of the specific elevator lifting mechanism shown various other types of mechanism could be suitably employed as, for example, the use of a hydraulic hoist.

In operation, sheet or like material delivered to belts 13 is charged or conveyed forwardly from left to right, as viewed in Figures 1 and 1a of the drawings. Prior to entry of the sheet through pinch rolls 15, the side plates 50 are adjusted to a spacing slightly greater than the width of the sheet to be received and the position of end stop 102 is adjusted relative to fluid pressure opening 145 and bumper 146 to a spacing slightly greater than the length of the sheet to be received. The elevator table 173 is raised such that the top of skid 171 is on substantially the same level as the bottom edges of side plates 50. It is also contemplated, where desired, that the skid 171 may be raised such that the top thereof is positioned within the space defined by the side plates. From fan 153, air pressure is delivered to duct members 151, 149, 147, 141, 142, 143, and 144 and escapes through opening 145 in a direction to impinge upon the underside of the sheet when it is received between side plates 50. Simultaneously therewith, air pressure can also be delivered to duct members 164, 162 and 160 and escaping through the openings in the lower ends of members 159 to impinges on the upperside of the sheet as it is received between side plates 50. As each successive sheet is conveyed forwardly on belts 13 it passes between driven pinch rolls 15 which ensure feeding of the sheet in between the side plates. As the sheet enters between the side plates the air issuing from opening 145 provides an air cushion for the sheet during its movement in between the side plates and abutment against end stop 102. As the rearward end of the sheet passes through pinch rolls 15 it starts to drop due to the weight thereof and the fact that air issuing from opening 145 is escaping around the rearward end of the sheet. To ensure against any undesirable upward movement of the rearward end of the sheet the air pressure issuing downwardly from members 159 acts to push the end of the sheet downward. As a result, the rearward end of the sheet will move downwardly past opening 145. With the removal of the air pressure issuing from opening 145 and impinging on the underside of the sheet, the sheet is caused to gravitationally fall upon skid 171 or upon the uppermost sheet previously deposited thereon. As the stack of sheets gradually builds of the elevator table 173 is progressively lowered such that none of the stacked sheets extend across opening 145.

At such time as a stack of sheets of desired height has been formed on skid 171 the movement of belts 13 is stopped, the elevator table 173 is lowered to floor level, the skid and stack of sheets thereon removed by means of a suitable tractor device, and an empty skid placed on the elevator table to be raised into operative position for further sheet stacking.

It will be seen from the above description of the novel material receiving and stacking apparatus that there is provided a simple, rugged, and efficient mechanism in which sheet material, or the like, is received and stacked in orderly fashion without being subjected to handling by mechanisms which might tend to buckle or bend the sheets or injure their surfaces. Moreover, the present invention is adapted for application to sheet material, or the like, of varying length, width and gauge.

Although the invention has been described in connection with one specific form of apparatus, it is to be understood that various changes, alterations and modifications can be made thereto without departing from the spirit and scope of the invention as defined in the appended claims, in which what is claimed is:

1. In an apparatus for vertically stacking semi-rigid sheets, an elevator table, guide means disposed to either side of said elevator table, a stop means positioned at one end of said table, a sheet feeding means disposed at the other end of said table for feeding metallic sheets in a horizontal path toward and against said stop means and between said guide means, said feeding means including pneumatic means controlling and cushioning movement of a sheet to a position of rest on said elevator table, said last mentioned means comprising upper and lower discharge orifices, means providing continuous independent sources of pneumatic pressure in communication with each of said orifices, said lower orifice being disposed to direct a constant uninterrupted stream of fluid pressure beneath a sheet and at an angle relative to the direction of movement of the sheet such as to complement movement thereof into overlying relation with respect to the elevator table while supporting said sheet from edge-to-edge on an uninterrupted fluid cushion, said upper discharge orifice directing an independent and uninterrupted stream of fluid pressure against the upper surface of said sheet over a comparatively small area, the delivery of fluid pressure from said upper orifice against the upper surface of the sheet being sufficient to overcome the cushioning and supporting effect of the stream of fluid pressure acting on the undersurface of the sheet as the trailing edge thereof passes beyond the point of discharge of said lower orifice and the leading edge thereof abuts said stop means to cause the trailing edge of the sheet to be displaced downwardly below the point of discharge of said lower orifice such that the fluid support created beneath the sheet by the lower discharge orifice is disrupted and said sheet may gravitate vertically, downwardly to a position of rest onto said elevator table without appreciable lateral movement in an edgewise direction.

2. In an apparatus for stacking sheets of a semi-rigid nature in a vertical pile, a sheet delivering means for delivering sheet along a horizontal plane, an elevator table receiving the delivered sheet from said sheet delivery means, side guide for orienting the delivered sheets in vertically co-extensive relation on said elevator table, a stop means adjacent said elevator table positioned in the path of movement of the sheet from said delivery means, said delivering means including a sheet conveying and supporting means comprising the sole means for conveying the sheet onto said elevator table, said conveying and supporting means comprising a lower fluid discharge orifice, a continuously acting source of pneumatic pressure in communication with said lower discharge orfice, said lower orifice being disposed below the plane of horizontal movement of said sheet toward said elevator table and discharging a continuous uninterrupted fluid stream beneath the sheet over the entire undersurface area thereof sufficient to support and maintain the sheet suspended above the elevator table, an upper orifice disposed above the plane of horizontal movement of the sheet, a constantly operating source of pneumatic pressure in communication with said upper discharge orifice, said upper discharge orifice directing a constant uninterrupted stream of fluid against the upper surface of the sheet, said second fluid stream being independent of said first mentioned fluid stream and acting only upon a small area of the sheet and being sufficient in conjunction with the normal pull of gravity to deflect the trailing edge of the sheet below the point of discharge of said lower orifice as a leading edge of the sheet engages the stop means thereby to disrupt the lower supporting fluid stream to permit the sheet to gravitate vertically onto said elevator table.

3. A metallic sheet stacking apparatus as defined in claim 2, wherein said side guide means, said stop means and said elevator table form a box-like sheet receiving receptacle having one open side in communication with said sheet feeding means, a common frame carrying said sheet stop means and said sheet guide means, means adjustably supporting said sheet stop and said sheet guide means from said frame whereby the dimension of said sheet receiving receptacle may be varied in accordance with the dimension of the sheets being stacked.

4. A pneumatic stacking apparatus as defined in claim 2 wherein said stop means comprises a plate member, and a pair of swingable support members connected to said plate and pivoted to a movable carriage carried by said frame for swinging in an arc about an axis transverse in the direction of movement of a sheet against said plate, a fluid operated shock absorption device behind said plate and engageable thereby such that impact of a sheet against said plate will cause said plate to engage said shock absorption means to terminate movement of said plate over said table with deformation of the edge of the sheet.

5. A pneumatic stacking apparatus as defined in claim 2 wherein said swingable plate is provided with a surface comprising shock absorption material for receiving initial impact due to contact of the sheet being stacked against said stop means.

6. A pneumatic stacking apparatus as defined in claim 2 wherein said side guide means comprises spaced parallel members, elongated in the direction of movement of the sheet being stacked and disposed to either side of said elevator table, and further wherein said means for mounting said guide members on said frame comprises a pair of spaced parallel tubular members disposed above and transversely of the elongated parallel members, roller means engageable with said tubular members, means connecting each end of said elongated members to said rollers whereby said members may move laterally of their length toward and away from each other, and common means including a prime mover for affecting simultaneous equal and opposite movement of said elongated members relative to each other and said elevator table.

7. A stacking apparatus as defined in claim 6 wherein said parallel elongated members comprise vertically disposed plates having upwardly directed, outwardly divergent upper portions coextensive therewith.

References Cited in the file of this patent

UNITED STATES PATENTS

| | | |
|---|---|---|
| 2,257,469 | Keil | Sept. 30, 1941 |
| 2,332,863 | Luehrs | Oct. 26, 1943 |
| 2,412,085 | Glush | Dec. 3, 1946 |
| 2,517,388 | Daves | Aug. 1, 1950 |
| 2,566,240 | Mursch | Aug. 28, 1951 |
| 2,626,800 | Martin | Jan. 27, 1953 |

UNITED STATES PATENT OFFICE
CERTIFICATE OF CORRECTION

Patent No. 2,882,048                        April 14, 1959

Arthur Dean Smith

It is hereby certified that error appears in the printed specification of the above numbered patent requiring correction and that the said Letters Patent should read as corrected below.

Column 5, line 17, for "One" read -- On --; column 7, line 45, after "then" insert -- passes --; column 8, line 30, for "impings" read -- impinge --; line 51, for "of", second occurrence, read -- up --; column 10, line 24, for "in" read -- to --.

Signed and sealed this 31st day of January 1961.

(SEAL)
Attest:

KARL H. AXLINE
Attesting Officer

ROBERT C. WATSON
Commissioner of Patents